Aug. 21, 1962    J. H. ZERWICK    3,050,325
AIRCRAFT DOOR LATCH
Filed Aug. 16, 1961    3 Sheets-Sheet 3
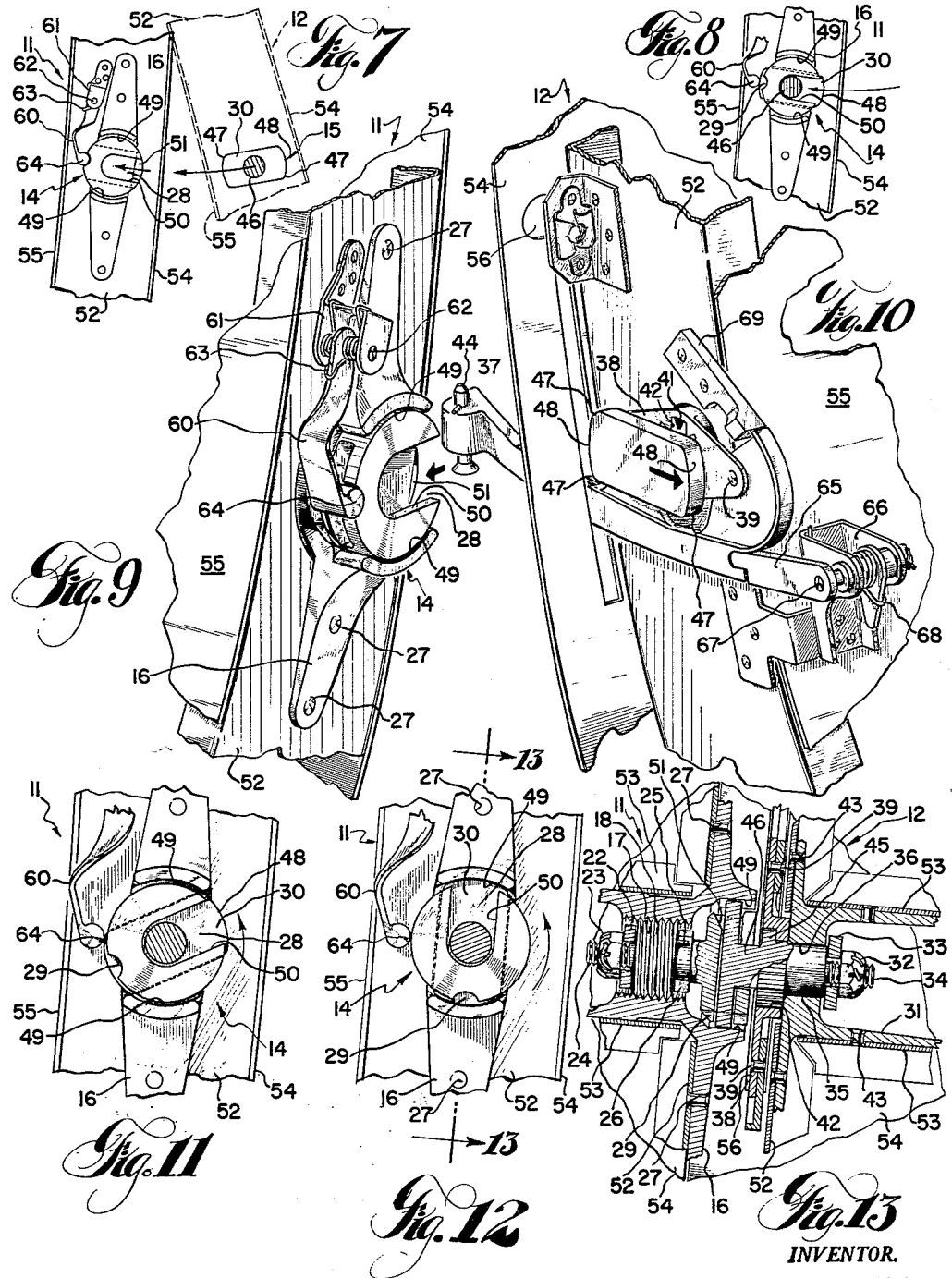
INVENTOR.
JOHN H. ZERWICK
BY
ATTORNEY United States Patent Office 3,050,325
Patented Aug. 21, 1962

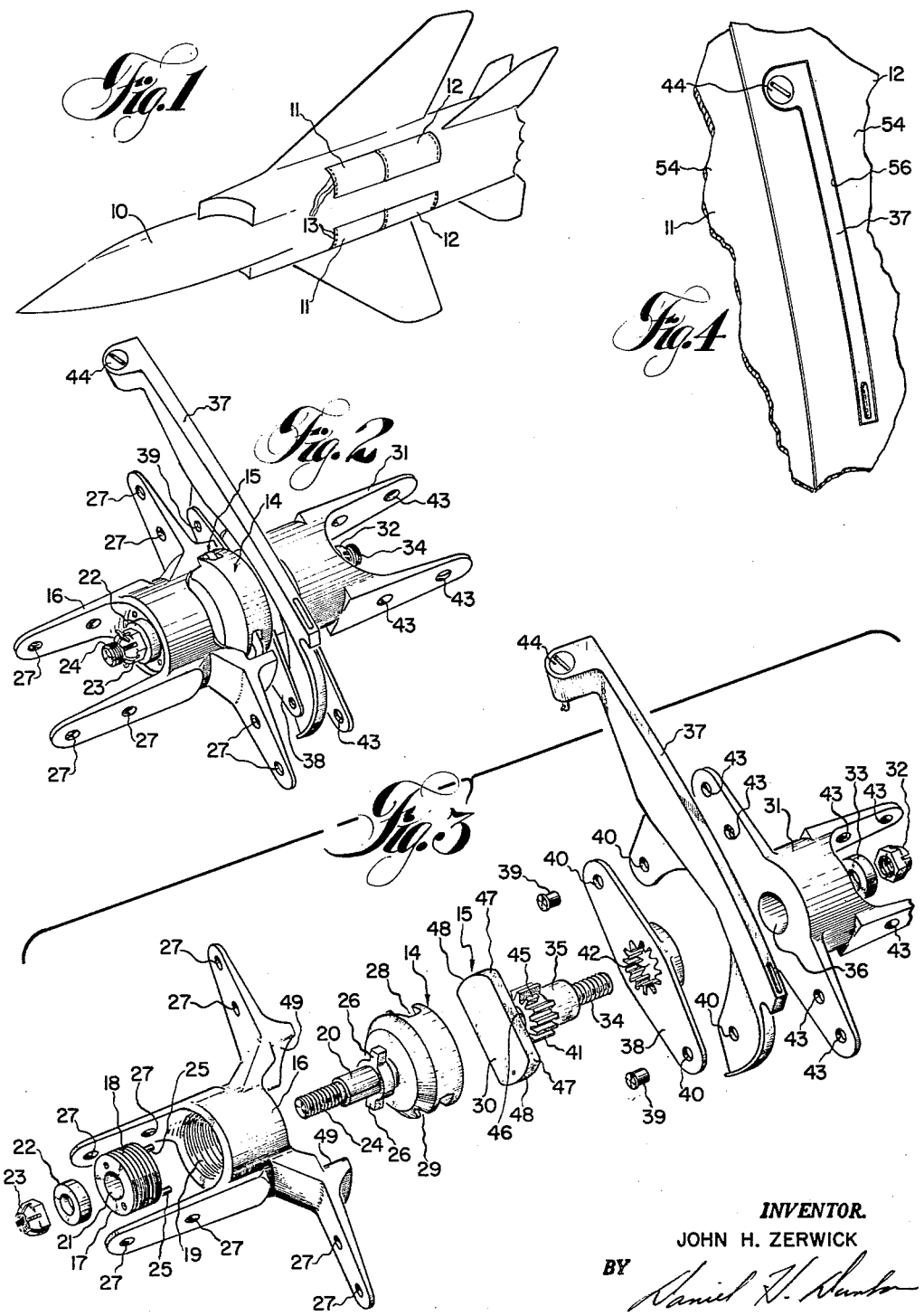

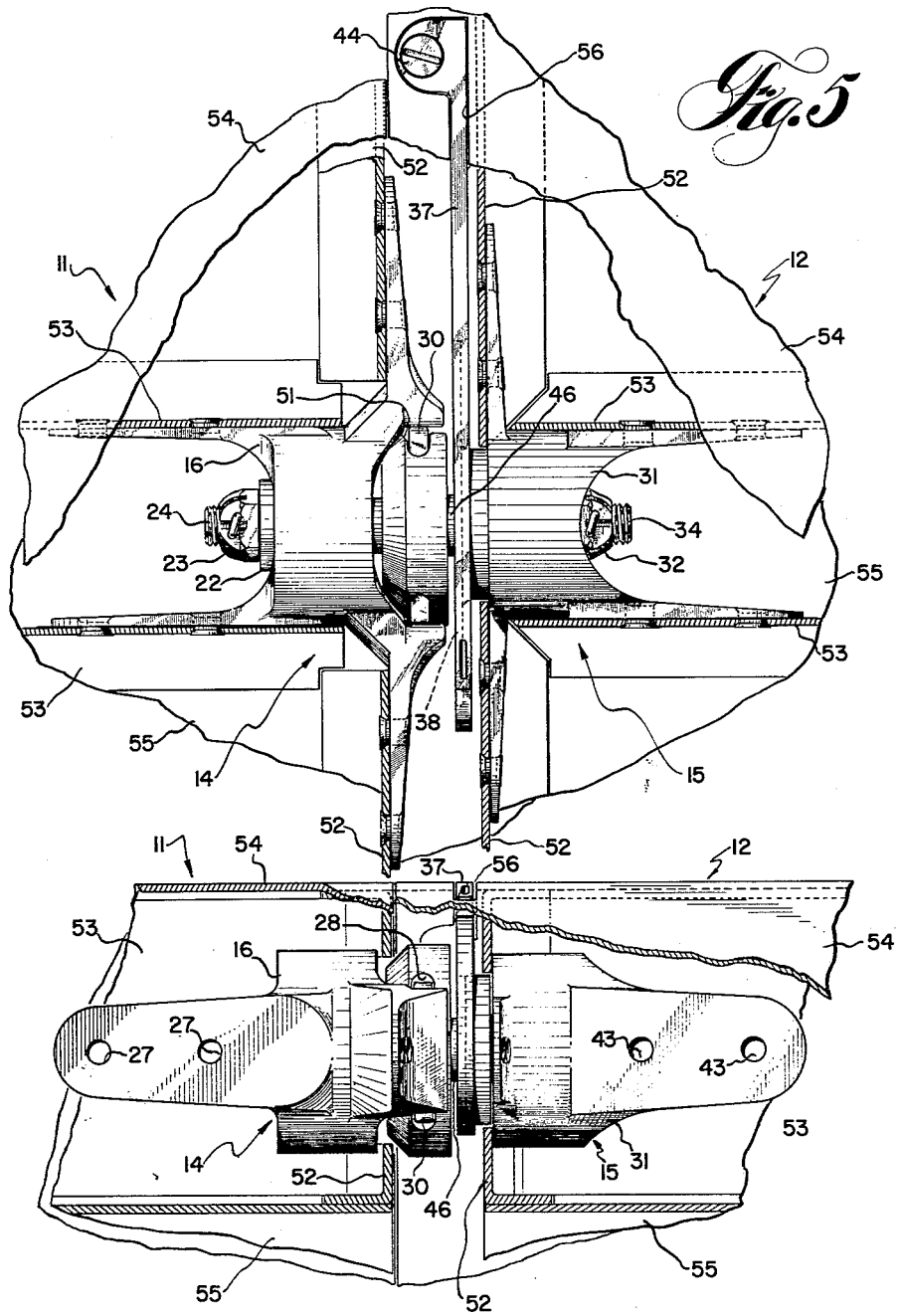

3,050,325
AIRCRAFT DOOR LATCH
John H. Zerwick, Columbus, Ohio, assignor to
North American Aviation, Inc.
Filed Aug. 16, 1961, Ser. No. 131,888
6 Claims. (Cl. 292—218)

This invention concerns a latch assembly which obtains important advantages when utilized for the purpose of latching a hinged aircraft door assembly to adjacent support structure or the like.

It is an important object of this invention to provide an aircraft door latch assembly with latching components which when engaged efficiently transmit through the latch assembly external shear loadings imposed thereon from any direction transverse to the door hinge axis and also any external tension or compression loadings simultaneously imposed thereon along directions parallel to the door hinge axis.

Another object of this invention is to also provide an aircraft latch mechanism which may be mounted flush with respect to adjacent aircraft exterior surface areas and which may be installed in a generally concealed manner.

A still further object of this invention is to also provide an improved aircraft door latch with latching components which may be engaged in a manner that permits of a degree of transverse and longitudinal misalignment between such components.

Another object of this invention is to also provide an aircraft door latch with latching components which readily obtain a mechanical advantage which is useful in connection with latching operations subsequent to engagement of the latching components in a misaligned condition.

A still further object of my invention is to also provide an aircraft door latch with means for restraining disengaged latching components thereof in a proper relation to each other to facilitate subsequent engagement operations.

Another object of this invention is to also provide an aircraft door latch which may be readily adjusted to compensate for gross variations in the position of to-be engaged latching components caused during latch assembly installation.

Other objects and advantages of this invention will become apparent during consideration of the description and drawings.

In the drawings:

FIG. 1 illustrates an application of the door latch of this invention to an airplane;

FIG. 2 illustrates the preferred embodiment of my door latch invention in assembled relation;

FIG. 3 is an exploded perspective view of the door latch components shown in FIG. 2;

FIGS. 4 through 6 illustrate components of the door latch of this invention in an installed and completely latched condition;

FIGS. 7 through 12 illustrate the operation of the door latch of this invention during engaging and latching procedures; and FIG. 13 is a sectional view taken at line 13—13 of FIG. 12.

The door latch of this invention has found considerable application in connection with the securing of access doors in certain types of aircraft. As shown in FIG. 1, a high-performance airplane 10 may incorporate engine bay access doors 11 and 12 to facilitate engine installation and maintenance operations. In the arrangement shown in FIG. 1, it is required that access doors 11 and 12 serve as integral structural portions of the airplane fuselage. Such doors are hinged along their generallly horizontal upper edge and are further joined together and to the airplane fuselage by the latch devices designated generally as 13. In view of the structural functions associated with door assemblies 11 and 12, it is necessary that latch devices 13 be capable of simultaneously transmitting through the latch all external tension (or compression) and shear loads imposed upon the separate components thereof. It is also necessary that the latching components of the latch assembly permit engagement and latching in a convenient manner and even though initial misalignment of the components may occur due to installation or aircraft load variations. The door latch illustrated in FIGS. 2 through 13 incorporates the features of my invention and may be used to obtain advantages over known door latches when utilized in applications such as that illustrated and described in connection with FIG. 1.

As shown in FIGS. 2 and 3, the preferred embodiment of the door latch of this invention includes socket member 14 and T bolt member 15. Socket member 14 cooperates with socket retaining fitting 16 for support and is secured thereto through the adjusting nut designated 17. The exterior threads 18 of adjusting nut 17 engage corresponding interior threads 19 provided in socket retaining fitting 16. A collar 20 is provided on the shank of socket 14 and is of slightly greater length and lesser diameter than the axial bore 21 provided in adjusting nut 17. When socket 14 is engaged with adjusting nut 17 and held in engagement by washer 22 and by the castellated nut 23 (and cotter pin) which engages the threaded end 24 of the shank of socket 14, such socket may be rotated relative to the adjusting nut. To limit relative rotation between socket 14 and adjusting nut 17 to not more than approximately 180° in any direction, adjusting nut 17 is provided with diametrically opposed stop pins 25 and socket 14 is provided with diametrically opposed lug portions 26. Thus, during normal use of socket 14, such socket may be rotated up to approximately 180° without varying its relative longitudinal position. If adjustment in the longitudinal position of socket 14 relative to fitting 16 is required, socket 14 is rotated to engage lugs 26 with stop pins 25 and thereby simultaneously rotate adjusting nut 17. Rotation of nut 17 advances or retracts socket 14 relative to fitting 16. Openings 27 are provided in the various arm portions of socket retaining fitting 16 for use in attaching the fitting to access door or aircraft fuselage structure. Details regarding the recess 28 provided in socket 14 to receive the elongated head 30 of T bolt 15 will be hereinafter described. Recess 29 is provided for use in a detent arrangement.

T bolt member 15 is secured to T bolt retaining fitting 31 by a nut 32 and washer 33 which engage the threaded end 34 of the shank of T bolt 15. A collar portion 35 is provided on the shank of T bolt 15 and is of slightly greater length and lesser diameter than the axial bore 36 provided in fitting 31 to develop the necessary bearing support. A handle 37 is attached to T bolt 15 through the splined adaptor fitting designated 38. Rivets 39 and openings 40 are provided to obtain the necessary fastening as between handle 37 and adaptor fitting 38. The spline portion 41 provided on the shank of T bolt 14 cooperates with the splined recess 42 provided in adaptor fitting 38 to obtain positive rotational interlocking between such components. Openings 43 are provided in the various arms of retaining fitting 31 for use in attaching the retaining fitting to cooperating access door or aircraft fuselage structure. A separate fastener 44 may be provided for use in securing the door latch handle in place when the latching components are in a completely engaged condition. One spline element such as 45 may be arranged to bottom in recess 42 (FIG. 13) to limit movement of the handle-adaptor combination relative to T bolt elongated head 30 in a manner which assures freedom for engagement of shank portion 46 (FIG. 13) with recess 50 (FIG. 12).

Other details regarding socket member 14 and T bolt member 15 are illustrated in the additional figures of the drawings. T bolt member 15 has a reduced-diameter shank portion 46 located intermediate spline portion 41 and elongated head 30. Head 30 is provided with end surfaces 48 which each cooperate with a bearing surface 49 provided in socket fitting 16 (FIG. 11). Surfaces 48 and 49 each define a portion of a circular arc when viewed in end elevation. The end wall of socket member 14 is provided with a U-shaped recess 50 and the opposite socket wall is provided with the ramp portion designated 51. As suggested above, the contour of each bearing surface 49 corresponds to the contour of each end surface 48 of T bolt head 30 so that when the T bolt head and socket are engaged and latched by rotation to the position shown in FIG. 12 all external shear forces applied to the latch assembly in any direction transverse to the latch assembly longitudinal axis are efficiently transmitted from one retaining fitting of the assembly to the other retaining fitting by direct contact between elongated head 30 and the bearing surfaces 49 of fitting member 16. Tension-compression forces applied externally to the latch assembly are transmitted, on the other hand, from retaining fitting 31 and elongated head 30 to fitting member 16 through socket member 14 and adjusting nut 17. The sides of T bolt head 30 and the sides of recess 28 are of different dimensions to permit engagement of T bolt 15 with socket 14 even though some transverse misalignment might exist. Reduced shank portion 46 is of lesser dimension than the U-shaped recess 50 provided in the end wall of socket member 14 for a similar purpose. Generous corner radii 47 are provided at each extreme end of arcuate surface 48 to develop a camming action as between T bolt 15 and socket fitting 16 during latching operations to thereby overcome transverse misalignment if initially present. A mechanical advantage may be achieved during the latching operation through forces applied to handle 37 to thereby urge the latch assembly latching components into proper engaged relation. Longitudinal misalignment may be partially overcome by a camming action associated with ramp 51 during engagement of the latch assembly latching components. Gross adjustments in longitudinal misalignment may be compensated for through use of previously-discussed adjusting nut 17. The thickness of T bolt elongated head 30 corresponds closely to the minimum thickness of recess 28 so that tension-compression loads may be transmitted through components 14 and 15 substantially without lost motion.

The manner in which the latch assembly of this invention may be installed in an aircraft door assembly or in support structure adjacent thereto is best illustrated in FIGS. 4 through 6. As shown therein, socket fitting 16 is mounted on close-out members 52 and on structural reinforcement members 53. Fitting 31 is mounted on similar close-out and structural support members in door assembly 12. Conventional fasteners (e.g., rivets) may be used to secure such components together and are not shown. An exterior surface skin 54 and an interior surface skin 55 are typically attached to members 52 and 53 by conventional fastener means (not shown). The longitudinal axis of the latch assembly of this invention is positioned parallel to the hinge axis of an incorporating aircraft door assembly and corresponds to the longitudinal axes of the shank portions to socket member 14 and T bolt member 15. A suitable cut-out 56 (FIG. 10) is provided in exterior surface skin 54 to accommodate handle 37. As shown in FIG. 4, handle 37 is installed flush with the exterior surface of door assembly 12 and has a contour corresponding to the contour of exterior skin 54.

Several construction features are provided in the latch assembly of this invention to facilitate engagement operations as between the various latching components. A lever member 60 is attached to door bracket 61 by pin means 62. See FIG. 9. A torsion spring means 63 urges the detent portion 64 of member 60 into contacting relation with the cylindrical surface of socket member 14. Recess 29 is located in socket member 14 at a position whereby member 14 will be restrained in a proper pre-engagement position through cooperation of elements 64 and 29. Such pre-engagement position is shown clearly in FIGS. 7 and 9. When latch engagement is effected, an end surface 48 of T bolt head 30 engages the detent portion 64 of member 60 to disengage the detent from recess 29.

The latch assembly of this invention is also provided with means for restraining the T bolt and T bolt handle combination in a proper position when the latching components of the invention are in proper pre-engagement position. Suitable means for achieving this function is shown best in FIG. 10. Arm 65 is pivotally connected to support bracket 66 by pin means 67. Such arm member is arranged in contacting relation to a curved end surface portion of handle 37 and is urged against that curved surface by torsion spring 68. Handle 37 is readily urged towards its FIG. 10 open position by the rotational moment established by arm 68 acting on the handle curved end portion. Thus, as T bolt 15 is brought into engagement with socket member 14, the T bolt member is not readily disturbed or moved to a non-engaging position because of minor transverse misalignment conditions existing between various latching components. Stop member 69 is attached to close-out member 52 to limit the action of member 65 on handle 37.

I claim:

1. In a door latch assembly having engaged portions which are effective to simultaneously transmit loads in a direction along a longitudinal axis which parallels a hinge axis and other loads in all directions transverse to said longitudinal axis, in combination: a socket means having an elongated recess oriented transverse to said longitudinal axis, a T bolt means which is installed in the latch assembly separate from said socket means, which is rigidly restrained by said socket means in directions along said longitudinal axis, and which has an elongated head that is engaged with said socket means elongated recess in a direction transverse to said longitudinal axis, and bearing surface means for transmitting shear loads to and from said T bolt means, said bearing surface means contacting said T bolt means elongated head and being transversely fixed relative to said socket means with said socket means rotatable relative thereto.

2. The door latch assembly defined in claim 1, wherein said T bolt means elongated head is provided with a bearing surface having a circular arc profile when viewed from said longitudinal axis, said bearing surface means having a profile which corresponds to said T bolt means elongated head bearing surface profile when the latch portions are engaged to transmit loads in directions parallel to and transverse to said longitudinal axis.

3. The door latch assembly defined in claim 1, wherein a camming surface is provided on said T bolt means elongated head and wherein a handle means is connected to said T bolt means for developing a camming force which aligns the latch portions relative to said longitudinal axis, said camming surface engaging said bearing surface means and developing a camming force when said handle means and said T bolt means are rotated to latch portions of the latch assembly from a transversely misaligned condition.

4. The door latch assembly defined in claim 1, wherein said socket means recess is provided with an entrance opening which is transversely aligned with said bearing surface means, said entrance opening being rotated relative to said bearing surface means and being accessible to said T bolt means elongated head when said socket means and said T bolt means are moved to a disengaged condition.

5. The door latch assembly defined in claim 1, wherein said T bolt means elongated head has opposed surfaces extending transverse to and spaced-apart along said longitudinal axis, said socket means engaging each of said T bolt means elongated head opposed surfaces in contacting relation in a manner whereby loads transmitted from said T bolt means to said socket means in directions parallel to said longitudinal axis are transmitted symmetrically with respect to said longitudinal axis.

6. The door latch assembly defined in claim 1, wherein a fitting is provided to carry said bearing surface means as an integral part thereof, said fitting and said socket means being threadably engaged in a direction along said longitudinal axis and in a manner whereby rotation of said socket means more than approximately 180° relative to said fitting will advance said socket means relative to said fitting along said longitudinal axis.

References Cited in the file of this patent
UNITED STATES PATENTS

| | | |
|---|---|---|
| 1,061,409 | Ryan | May 13, 1913 |
| 2,235,949 | Shaw | Mar. 25, 1941 |
| 2,403,993 | Nyhus | July 16, 1946 |
| 2,861,830 | Bennett | Nov. 25, 1958 |